March 1, 1966 J. V. JENKINSON 3,238,424

SEMICONDUCTOR DEVICES AND METHOD OF FABRICATING THEM

Filed June 14, 1961

INVENTOR.
JOHN V. JENKINSON
BY Alfred H. Rosen
ATTORNEY

United States Patent Office 3,238,424
Patented Mar. 1, 1966

3,238,424
SEMICONDUCTOR DEVICES AND METHOD OF FABRICATING THEM

John V. Jenkinson, Lexington, Mass., assignor to Microwave Associates, Inc., Burlington, Mass., a corporation of Massachusetts Filed June 14, 1961, Ser. No. 117,039
4 Claims. (Cl. 317—234)

This invention relates to semiconductor devices and more particularly to improvements in the reliability thereof.

It is already well established that the reliability of component parts is a critical factor in the development of electron systems which can be depended upon to perform their assigned tasks. If the reliability of a given component is such that only one in ten thousand will fail during a six-months' storage period, or during an hour's operation of ten thousand of them, this reliability might be acceptable in systems employing only one or two of the component per system. It is not acceptable in systems employing ten thousand of the component per system, for the obvious reason that such systems must inevitably fail during the first hour of operation or during the first six months of inactive existence, and when they do fail, they present the problem of locating the one component in ten thousand which has failed.

Large scale electronic systems employing semiconductor devices by the thousands and even tens of thousands are now common. Such systems, as exemplified by large scale digital computers, first came into use under conditions which retained the possibility of making repairs to them in their working environment. The ability to locate and replace failed components in a minimum time is an essential service which must be provided with these systems in order to hold their "down time" to a minimum and provide their use for economically acceptable costs. At the present time, the use of large-scale computers is limited to situations in which relatively high service charges can be tolerated, in large part because of lost, or "down" time due to component failures.

More recently electronic systems are being used in environments where repair service is not available during operation. Thus, a system in a missile must have absolute reliability for the short period of time during which it is in use, while a system in a satellite or space vehicle must have absolute reliability for a period of time extending to months, or even years. In order to assure the longest possible reliability of such systems in use, they are frequently kept under constant, or repeated supervision and repair on the ground, until just prior to their use. As a result, tremendous quantities of ground support equipment must be provided for missiles, rockets, satellites, and space vehicles. This ground support equipment includes electronic systems, which also are subject to failure and must be serviced in the same way as other ground-based systems. The problems attendant upon component failure are thus seen to be cumulative, and in many situations, they are critical.

It is the principal and general object of this invention to provide semiconductor devices having superior reliability. More particularly, objects of the invention are to provide semiconductor devices which are:

(a) of such high reliability that they are not damaged during their assembly into systems under normal assembly conditions; and (b) of such high reliability that they can be stored indefinitely without any measurable deteriorations; and (c) of such high reliability that they will not fail in use throughout the expected life of the system in which they are incorporated.

A further object of the invention is to provide semiconductor devices of the aforesaid high reliability which can be made in packages of acceptably small size and ruggedness, and, preferably, in packages of the kind already in use with prior, less reliable, devices. Another object of the invention is to provide such highly reliable devices which can be made with straightforward techniques, by workers having existing fabrication skills, and at manufacturing costs which are competitive with the cost of manufacturing prior less reliable semiconductor devices.

According to the invention a semiconductor device comprising a body of electronic semiconductor material and two or more electrodes in contact therewith is provided with a coat of glass hermetically bonded to the exterior of the semiconductor at least in the region of contact with one of the electrodes, this electrode passing through the glass coating and being supported, and in some embodiments held in contact with the semiconductor body, by the glass structure. A housing is provided surrounding the semiconductor body and glass coat, and hermetically bonded to the electrodes which pass through the housing.

In a particular embodiment of a semiconductor device hereinafter described in detail, the housing is a tubular standard ceramic package about one-quarter inch in outer diameter and nearly one-half inch in axial length, and a point-contact semiconductor die is the semiconductor body. The housing is available in three parts, one part being a ceramic tubular piece and the other two being metal end caps which serve as electrodes. One of these electrodes bears at one end an elongated, for example, a spring contact conductor, extending therefrom. The free end of this conductor is brought into contact with a surface of the semiconductor body, which is preferably has been suitably prepared. The conductor end is held there with a suitable jig, a glass frit is applied, and heat is applied to melt the frit and form a glass coat hermetically bonded to the semiconductor body and to the end of the conductor in contact therewith. The composition of the glass frit, the method of forming the glass coat bonded to the semiconductor body and the conductor, and the particular type of contact may be as described in any of the following copending applications, which are all assigned to the assignee of the present application:

Serial No. 69,792 filed November 14, 1960; Serial No. 67,293 filed November 4, 1960; and Serial No. 67,294 filed November 4, 1960.

The portion of the semiconductor body on the opposite side of the junction may be left free of the glass coat, or enclosed by the glass coat, as desired. In either case, a second conductor, which may be similar to the first conductor, but preferably straight and elongated, is provided in contact at one end with the said portion. The remaining or second electrode has an axial bore in it. The first electrode is mounted in one end of the ceramic tubular piece with the semiconductor and glass coat assembly in the tube, and the second conductor extending through the other end thereof. The second electrode is fitted over the free end of the straight second conductor and then into place in the other end of the ceramic tube. The straight second conductor is soldered to the second electrode; any excess portion of the second conductor extending beyond the second electrode may be cut off.

Other and further embodiments and features of the invention will become apparent from the following description of certain embodiments thereof. The description refers to the accompanying drawings, wherein.

Figures 1, 2, 3, 3A, 4, 5, 6, 7:
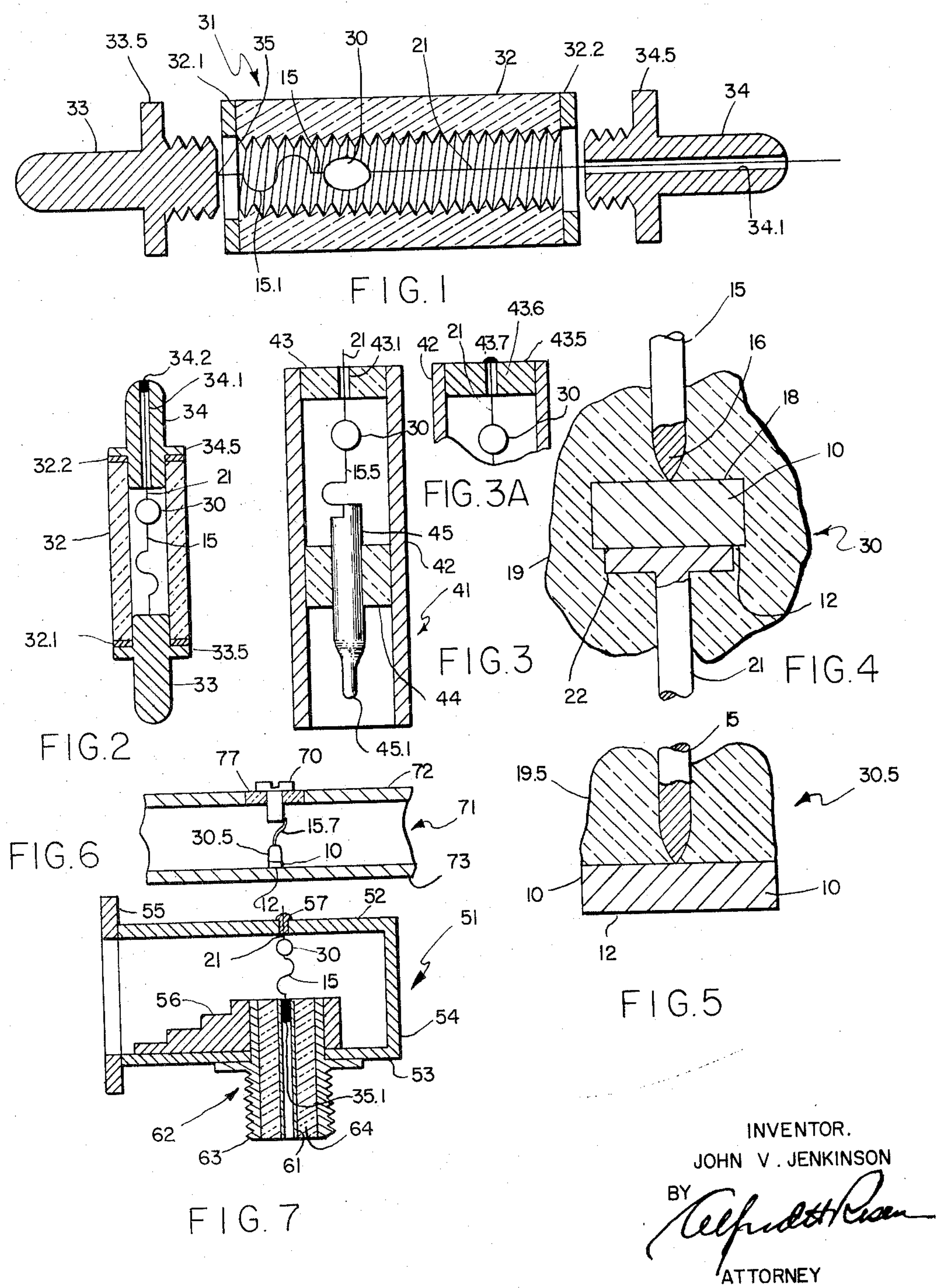
FIG. 1 is an exploded view in longitudinal section of a semiconductor diode according to the invention.
FIG. 2 is a longitudinal sectional view on a reduced scale, of the assembled device of FIG. 1.
FIG. 3 is a longitudinal sectional view of another embodiment of the invention.
FIG. 3A is a modification of FIG. 3.
FIG. 4 illustrates in side section a subassembly.
FIG. 5 shows another subassembly, also in side section.
FIG. 6 is a longitudinal section through another embodiment of the invention.
FIG. 7 is a longitudinal section through still another embodiment of the invention.

Referring first to FIG. 4, a semiconductor body 10, which may be made of silicon, for example, is in contact at opposite sides 18 and 12 with first and second elongated electrical conductors 15 and 21, respectively. The first elongated conductor 15, which may be spring loaded as hereinafter described, is in contact at a pointed end 16, with the top surface 18 (in FIG. 4) of the body 10. The first conductor 15 is thus a point-contact electrode, and makes a rectifying contact with the semiconductor body 10; it may be made of resilient ribbon-shaped or round wire, for example, tungsten. If it is round, this wire may be, for example, 3 mil. inches thick; if ribbon-shaped, it may have substantially the same cross-sectional area as the round wire. The second elongated conductor 21 has a flattened head 22 in contact with the bottom surface 12 (in FIG. 4) of the body 10. The second conductor 21 may be made of "Kovar," an alloy of iron, nickel and cobalt, for example. The conductors 15 and 21 and the body 10 may be brought and held together by means of a jig (not shown). Suitable jigs are known to the art. A glass housing 19 completely surrounds the body 10 and the conductors 15 and 21 at their ends 16 and 22, respectively, in contact with the body 10, and constitutes the sole mechanical support for holding said conductors in electrical contact with the semiconductor body.

A glass housing has been manufactured as follows. With the conductors 15 and 21 and the body 10 in contact in the relative positions shown in FIG. 4, a so-called "solder glass," in finely divided form (i.e., a "frit") available from Corning Glass Co., Corning, New York, as "#7574 Hard Glass," also known as "Pyroceram" #45, was mixed with a vehicle comprised of nitrocellulose as a binder and amylacetate as a solvent, to form a paste. The ratio of glass to vehicle depends to a large extent on the viscosity of the paste which is desired. This paste was applied to the exterior surfaces of the body 10 and conductors 15 and 21 as shown in FIG. 4, with a brush. The mixture was then fired in situ at a temperature in the range approximately 700° C. to 750° C., in air, until a glaze appeared on the paste, indicating that the paste had been converted to a vitreous glass. On continued firing at substantially the same temperature, a partially crystalline structure could be made to develop; this latter structure is a devitrified glass. During the firing step, the solvent evaporated and the binder burned off. This firing (and if desired, further firing) completed the fabrication of the housing 19.

Firing temperature may be achieved by any suitable means. Inductive heating has been employed with success. A suitable inductive heating process is illustrated and described in the above-referenced application Serial No. 67,294.

The housing 19 is hermetically sealed to the surfaces of the body 10, and the adjoining ends 16 and 22 of the conductors 15 and 21, respectively. Such housings, made as described above, are described and claimed in the above-referenced copending application Serial No. 69,792. The characteristics of this particular frit are that after being fired as described above, it forms a glass which is serviceable up to more than 700° C. As is explained in said application, Serial No. 69,792, the fabrication temperature of this glass (700° C.–750° C.) is hot enough to dry the surfaces of the body 10 almost instantaneously, with the result that substantially all surface impurities are either driven off or immobilized practically instantaneously, and the finished device has long-term surface reliability. Since it is the principal object of this invention to provide semiconductor devices having superior reliability, I prefer to fabricate the housing 19 by a process of the kind described above.

Referring now to FIG. 1, a subassembly 30, as shown in FIG. 4, having the conductors 15 and 21 extending therefrom, is disposed in an outer housing 31. This housing comprises a tubular ceramic member 32 and first and second electrodes 33 and 34, which are of a standard form in present-day use with silicon crystal rectifiers. The first conductor 15 has a curved spring portion 15.1 and is attached as by a suitable solder, at the end 35 remote from the subassembly 30, to the inner end of the first electrode 33. A suitable solder for this purpose is a tin-lead solder, having a melting point in the range 220° C. to 280° C., approximately. The second conductor 21 is relatively longer than the first conductor 15. The second electrode 34 has a bore 34.1 in it, through which the second conductor 21 can pass. The device of FIG. 1 is assembled by locating the subassembly 30 attached via the first conductor 15 to the first electrode 33, within the tubular member 32, and then assembling the first electrode 33 to the tubular member, which may be done by threading the electrode into the tubular member. The second conductor 21 then projects out of the opposite end of the tubular member 33, where the second electrode 34 is slipped over the free end of the second conductor and assembled to the tubular member, which may be done by threading the electrode into the tubular member. The assembled device is shown in FIG. 2.

The tubular member 32 has metallic end coatings 32.1 and 32.2. The housing is hermetically sealed by soldering the flanges 33.5 and 34.5 of the electrodes 33 and 34, respectively, to the end coatings 32.1 and 32.2, respectively, and by sealing the outer end of the bore 34.1 with solder 34.2. Any part of the second conductor 21 extending beyond the second electrode 34 may be cut off. The solder between the flanges 33.5 and 34.5 and the respective end coatings 32.1 and 32.2 is not shown, being well known. A suitable solder for this purpose, and for the seal 34.2 at the end of the second electrode 34, is a 60/40 or a 50/50 tin-lead alloy, or an equivalent solder.

In FIG. 3, the subassembly 30 is located in a housing 41, which comprises a cylindrical outer member 42, an end cap or plug 43, and an intermediate support member or plug 44. The cylindrical outer member 42 is made of metal, such as brass or copper. The end cap and intermediate plug are each made of a nonconductor, or an insulator. The first conductor 15.5 attached to the subassembly 30 is modified, as compared with the first conductor 15 of FIG. 1, in that the curved portion is electrically and mechanically bonded to one end of a pin 45 which passes through and is supported by the intermediate plug, in coaxial relation with the outer cylindrical member 42. The free end 45.1 of the pin 45 thus functions as the inner conductor of a coaxial line. The second conductor 21 attached to the subassembly 30 passes through a bore 43.1 in the end cap 43, where the free end of this conductor is available for electrical connection to a further conductor (not shown). The configuration of FIG. 3 will be recognized as a tripolar coaxial diode configuration. The outer housing 41 may be hermetically sealed with a cement (not shown) at the bore 43.1 and at the meeting surfaces of the intermediate plug 44 with the outer cylinder 42 and the pin 45. There is thus provided a coaxial diode of the tripolar type which has ruggedness and reliability not heretofore available.

FIG. 3A shows a modification of FIG. 3 in which an electrically conductive (e.g., copper or brass) end cap 43.5 is substituted for the nonconductive end cap 43 of FIG. 3, and the second conductor 21 of the subassembly 30 is soldered to the end cap after passing through the bore 43.6 therein. A solder 43.7 is used, similar to the solder 34.2 in FIG. 2.

Referring now to FIG. 7, the subassembly 30 is there shown incorporated in a broad band crystal mixer mount. This mount comprises a section 51 of rectangular waveguide having top and bottom wide walls 52 and 53, respectively, and an end closure 54 at one end. The open end is fitted with flange means 55, of any convenient known form, for attaching the section 51 to other waveguide or microwave components. A transition member 56 is mounted on the inner surface of the bottom wide wall 53, and approaches the opposite wide wall 52, from the open end to the closed end of the waveguide section 51. This transition member may be tapered or stepped, in practice; a stepped transition member is illustrated.

The first conductor 15 of the subassembly 30 has an extending free end portion 35.1 which is fitted into the bore of a center sleeve 61 of a coaxial coupling 62, of known form. This coupling includes an outer cylindrical member 63, an insulator 64 and the center sleeve 61. The end portion 35.1 of the first conductor 15 and center sleeve 61 may be soldered together at their adjoining free ends with a suitable solder (not shown) which may be similar to the solder 34.2 in FIG. 2. The transition member 56 may be a relatively narrow rib (relative to the width-dimension of the wide walls of the waveguide section), or it may extend a substantial distance across the wide dimension of the waveguide, depending upon the design of the transition. In either case, it will be wide enough at the region of the coaxial coupling 62 to support the outer cylindrical member, which may be fitted into it by means of screw threads (not shown). The second conductor 21 passes through an electrically conductive ground bushing 57 in the top wall 52.

Microwave frequency electromagnetic wave energy is introduced into the mixer at the open end; the end closure 54 is spaced from the subassembly 30 a distance such that reflected energy supports incident energy. Local oscillator energy is introduced via the open end of the mixer. Intermediate frequency signals are taken from the coaxial coupling 62, via a coaxial cable (not shown). The insulator 64 functions both as a support for the center sleeve 61 and the dielectric of a by-pass capacitor for R.F. energy, at the carrier (microwave) frequency.

FIG. 5 illustrates a diode subassembly 30.5 in which the lower surface 12 and side walls of the body 10 are not covered by the glass coat or housing 19.5. No conductor is attached to the base 12. The subassembly 30.5 is otherwise similar to the subassembly 30 shown in FIG. 4; it is also similar to the device illustrated in FIG. 1 of the aforementioned application Serial No. 67,293, and claimed therein. A suitable jig for holding the conductor 15 in rectifying contact with the semiconductor body 10 during formation of the housing 19.5 is shown and described in the above-referenced copending application Serial No. 67,294. The housing 19.5 is preferably made of the same material and in the same manner as the housing 19 in FIG. 4, and constitutes the sole means for holding the conductor 15 in rectifying point contact with the semiconductor body 10.

This subassembly is mounted across the narrow dimension of a rectangular waveguide as is shown in FIG. 6. A section 71 of such waveguide comprises top and bottom wide walls 72 and 73 has an insulating bushing 77 in the top wall. The conductor 15 is modified to another bend form 15.7, the free end of which is connected to an electrode 70, in essentially the same manner as the free end 35 of conductor 15 is connected to the first electrode 33 in FIG. 1. The electrode 70 is fitted into the bushing 77, as by threads (not shown), and the lower surface 12 of the body 10 rests in ohmic contact on the inner surface of the bottom wall 73. FIG. 6 is similar in some respects to FIG. 3 of my above-mentioned copending application Serial No. 67,294. This configuration is useful as a mixer, detector, converter, or a power monitoring device, for example. It will provide extremely high reliability and ruggedness in such use.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. Semiconductor device comprising a body of electronic semiconductor material, a first elongated electrical conductor having one end in contact with a surface of said body, a second elongated electrical conductor having one end flattened to present a surface transverse to the length dimension thereof and having said transverse surface in ohmic contact with another surface of said body, a glass housing consisting of a body of glass completely surrounding and hermetically sealed directly to the surfaces of said body and said conductors at their respective ends in contact with said body and constituting the sole mechanical support for holding said conductors in electrical contact with said body, said conductors extending through and beyond said glass housing, a second housing surrounding and spaced from said first housing, said second housing comprising a hollow member and first and second electrode means supported in mutually-electrically insulated spaced-apart relation by said hollow member, one of said first and second conductors having a curved spring portion intermediate its ends and the other of said conductors being substantially straight, said first conductor being electrically and mechanically connected at its remaining end to said first electrode means, and said second conductor being electrically and mechanically connected at its remaining end to said second electrode means, whereby said body and said glass housing are supported by said first and second conductors within said second housing spaced apart from the interior walls thereof.

2. Semiconductor device according to claim 1 in which the one of said first and second conductors which is substantially straight has a portion within said second housing the length of which is a minor fraction of the length of said spring portion of the other of said first and second conductors.

3. Semiconductor device comprising a body of electronic semiconductor material, a first elongated electrical conductor having one end in point-rectifying contact with a surface of said body, a second elongated electrical conductor having one end flattened to present a surface transverse to the length dimension thereof and having said transverse surface in ohmic contact with another surface of said body, a glass housing consisting of a body of glass completely surrounding and hermetically sealed directly to the surfaces of said body and said conductors at their respective ends in contact with said body including said flattened end of said second conductor and constituting the sole mechanical support for holding said conductors in electrical contact with said body, said conductors extending through and beyond said glass housing, a second housing surrounding and spaced from said first housing, said second housing comprising a hollow member of electrically insulating material and first and second spaced-apart rigid electrodes supported in spaced-apart relation by said insulating member, one of said first and second conductors having a curved spring portion intermediate its ends and the other of said conductors being substantially straight, said first conductor being electrically and mechanically connected at its remaining end to said first electrode, and said second conductor being electrically and mechanically connected at its remaining end to said second electrode, whereby said body and said glass housing are supported by said first and second conductors within said second housing spaced apart from the interior walls thereof.

4. Semiconductor device comprising a body of electronic semiconductor material, a first elongated electrical conductor having one end in contact with a surface of said body, a second elongated electrical conductor having one end flattened to present a surface transverse to the length dimension thereof and having said transverse surface in ohmic contact with another surface of said body, a glass housing consisting of a body of glass completely surrounding and hermetically sealed directly to the surfaces of said body and said conductors at their respective ends in contact with said body and constituting the sole mechanical support for holding said conductors in electrical contact with said body, said conductors extending through and beyond said glass housing, a second housing surrounding and spaced from said first housing, said second housing comprising a hollow tubular metallic member, a first annular member supported within said tubular member intermediate its first and second ends, an elongated rigid electrode supported within said first annular member and extending at its first end toward said first end of said tubular member and at its second end toward said second end of said tubular member, said second end of said rigid electrode terminating within said tubular member, a second annular member supported within said tubular member at said second end thereof, one of said first and second conductors having a curved spring portion intermediate its ends and the other of said conductors being substantially straight, said first conductor being electrically and mechanically connected within said tubular member at its remaining end to said second end of said rigid electrode, electrode means electrically connecting the remaining end of said second conductor to the exterior of said second housing through said second annular member, means insulating said rigid electrode and said electrode means from said tubular member, said first end of said rigid electrode being substantially coaxially disposed within said tubular member in the vicinity of said first ends of each outside said first annular member relative to the interior of said second housing, whereby said body and said glass housing are supported by said first and second conductors within said second housing spaced apart from the interior walls thereof and said tubular member at said first end thereof is a third electrode member of a tri-polar coaxially-diode configuration.

References Cited by the Examiner

UNITED STATES PATENTS

| | | | |
|---|---|---|---|
| 2,560,579 | 7/1951 | Kock et al. | 317—236 X |
| 2,707,319 | 5/1955 | Conrad | 317—236 X |
| 2,853,661 | 9/1958 | Houle et al. | 317—234 |
| 2,882,466 | 4/1959 | Weaver et al. | 317—236 |
| 3,022,452 | 2/1962 | Williams et al. | 317—236 |
| 3,025,435 | 3/1962 | Green | 317—234 |

JOHN W. HUCKERT, *Primary Examiner.*

GEORGE N. WESTBY, DAVID J. GALVIN, *Examiners.*